United States Patent
Garg

(10) Patent No.: US 10,830,394 B2
(45) Date of Patent: Nov. 10, 2020

(54) COMPOSITE PRESSURE VESSEL HAVING INTERNAL LOAD SUPPORT

(71) Applicant: Quantum Fuel Systems LLC, Lake Forest, CA (US)

(72) Inventor: Mohit Garg, Lake Forest, CA (US)

(73) Assignee: Quantum Fuel Systems LLC, Lake Forest, CA (US)

(*) Notice: Subject to any disclaimer, the term of this patent is extended or adjusted under 35 U.S.C. 154(b) by 0 days.

(21) Appl. No.: 15/985,569

(22) Filed: May 21, 2018

(65) Prior Publication Data

US 2018/0372272 A1     Dec. 27, 2018

Related U.S. Application Data

(63) Continuation of application No. PCT/US2016/063405, filed on Nov. 22, 2016.
(Continued)

(51) Int. Cl.
  *F17C 1/02* (2006.01)
  *F17C 1/00* (2006.01)
  *F17C 1/06* (2006.01)

(52) U.S. Cl.
  CPC .......... *F17C 1/02* (2013.01); *F17C 1/00* (2013.01); *F17C 1/005* (2013.01); *F17C 2203/013* (2013.01); *F17C 2203/0604* (2013.01); *F17C 2203/067* (2013.01); *F17C 2203/0619* (2013.01); *F17C 2203/0663* (2013.01); *F17C 2205/0305* (2013.01); *F17C 2205/0391* (2013.01); *F17C 2205/0394* (2013.01); *F17C 2209/2154* (2013.01); *F17C 2221/012* (2013.01); *F17C 2221/033* (2013.01); *F17C 2260/011* (2013.01); *F17C 2260/012* (2013.01);
(Continued)

(58) Field of Classification Search
  CPC .... F17C 1/02; F17C 1/00; F17C 1/005; F17C 2203/012; F17C 2203/0604; F17C 2203/0619; F17C 2203/0663; F17C 2203/067; F17C 2209/2154
  USPC ........................................ 220/592, 586, 589
  See application file for complete search history.

(56) References Cited

U.S. PATENT DOCUMENTS 2,848,133 A    8/1958   Ramberg
3,367,815 A    2/1968   Ragettli et al.
(Continued)

FOREIGN PATENT DOCUMENTS

CN    1148679 A      4/1997
CN    101855488 A    10/2010
(Continued)

OTHER PUBLICATIONS

European Patent Application No. 16869192.1; Extended Search Report; dated Oct. 18, 2018; 8 pages.
(Continued)

*Primary Examiner* — J. Gregory Pickett
*Assistant Examiner* — Niki M Eloshway
(74) *Attorney, Agent, or Firm* — Baker Hostetler

(57) ABSTRACT

A device, system and method to support the ends of composite pressurized storage vessel, including supporting two ends of a cylindrical composite pressurized storage vessel with an axial rod/tube fixed axially inside the storage vessel fixed at each end; and providing a fluid pathway into the vessel from at least one of the two ends which is not obstructed by the axial rod/tubing.

5 Claims, 3 Drawing Sheets

Related U.S. Application Data

(60) Provisional application No. 62/259,490, filed on Nov. 24, 2015.

(52) U.S. Cl.
CPC ....... *F17C 2260/017* (2013.01); *Y02E 60/321* (2013.01)

(56) References Cited

U.S. PATENT DOCUMENTS

| | | | | |
|---|---|---|---|---|
| 3,368,708 | A | * | 2/1968 | Pflederer .............. B65D 90/029 220/582 |
| 4,588,622 | A | | 5/1986 | Sukarie |
| 5,088,622 | A | * | 2/1992 | Valy ...................... B64G 1/402 222/213 |
| 5,758,796 | A | | 6/1998 | Nishimura et al. |
| 6,015,065 | A | * | 1/2000 | McAlister ................ F17C 1/02 220/501 |
| 8,464,893 | B2 | * | 6/2013 | Iida ...................... B29C 70/086 156/156 |
| 2004/0108319 | A1 | | 6/2004 | Bettinger |
| 2006/0060289 | A1 | | 3/2006 | Carter et al. |
| 2009/0126816 | A1 | | 5/2009 | Rajabi et al. |
| 2014/0096895 | A1 | * | 4/2014 | Emori ................. B29D 22/003 156/172 |
| 2014/0099456 | A1 | * | 4/2014 | Raghavendran .......... E04C 5/07 428/34.4 |
| 2014/0360608 | A1 | * | 12/2014 | Vickio, Jr. ............. F15B 1/165 138/31 |
| 2015/0345707 | A1 | * | 12/2015 | Landeck .................. F17C 1/00 165/53 |

FOREIGN PATENT DOCUMENTS

| | | |
|---|---|---|
| DE | 1625937 A1 | 8/1970 |
| EP | 2060797 A2 | 5/2009 |
| GB | 2096299 A | 10/1982 |

OTHER PUBLICATIONS

International Patent Application No. PCT/US2016/063405; Int'l Search Report and the Written Opinion; dated Feb. 3, 2017; 7 pages.
International Patent Application No. PCT/US2016/063405; Int'l Preliminary Report on Patentability; dated Jun. 7, 2018; 6 pages.

* cited by examiner

COMPOSITE PRESSURE VESSEL HAVING INTERNAL LOAD SUPPORT

CROSS-REFERENCE TO RELATED APPLICATIONS

This application claims priority to U.S. Provisional Patent Application No. 62/259,490 filed Nov. 24, 2015, the contents of which are hereby incorporated in their entirety as if fully set forth herein.

TECHNICAL FIELD

Pressure vessel axial load management.

BACKGROUND

Traditional designs for portable or lightweight pressure vessels to store H2 and CNG are costly. A filament wound composite overwrapped pressure vessel (COPV) constitutes of thick overwrap, plastic liner and metallic fittings. The overwrapped structure is a combination of structural fibers and a resin. Continuous fibers provide tensile strength for structural integrity while the resin carries shear loads in the composite and maintains the fiber position. As the fiber/resin composite is generally not considered pressure tight, the composite is applied over a fluid-retention barrier that serves as an interior liner for the composite. These fluid-retention barriers may be a rubber, plastic, or thin ductile metal liner. These liners serve to maintain acceptable leak rates and fluid purity but add little, if any, structural integrity. For lightweight, high-efficiency applications, the COPVs offer a significant weight advantage, approximately one-half the weight of a comparable metal tank. Most performance efficient and cost-effective tank design efforts mostly focus on use of less expensive carbon fibers or hybrid (carbon+glass) fibers.

Some research efforts are made including enhancing the resin used during the winding process. The majority of the filament winding is done using similar wind patterns that include hoop and helical layers. The hoop layers take the circumferential load, while the helical layers take the axial load. The filament winding process does include use of high angle helical layers that take both hoop and axial load. The high angle layers reinforce the dome-cylinder transition area. The hoop layers are very efficient in reinforcing the cylinder section from circumferential load; however, they are very inefficient in reinforcing the cylinder from axial load. They are difficult to wind over, quite common, geodesic isotensoid dome shapes. Helical layers are used to overcome the shortcomings of hoop layers and improve the axial stress carrying capability by the composite overwrap. The number of helical layers is usually more than required in a tank. Helical layers are either low or high angle helical layers. The low angle helical layers mostly take the axial load and are used to hold the metal fittings near the polar openings of the COPV. The continuous filament winding process forces tank manufacturers to wind low angle helical layers over the cylinder section. These low angle helical layers add unnecessary weight and reduce the storage volume of the tanks (for fixed external tank dimensions).

DISCLOSURE

Since the single major cost factor is carbon fiber in manufacturing a COPV (60%-75%), it will be ideal to have a high strength, high modulus carbon fiber at a fraction of the current typical carbon fiber cost ($26.50/kg-$33.10/kg in 2015 dollars). Efforts are being made by several carbon fiber vendors in this area.

Filament winding consists of wet (resin impregnated fiber) and dry (towpreg) winding types. The dry winding is a very expensive process compared to wet winding; however, it allows more control and consistent wind patterns. Both wet and dry filament winding of composite shells involves the winding of hoop and helical layers over a liner. The hoop winding supports the hoop stress and defines the burst capability of the tank and reinforces the cylinder section of the pressure vessel. The helical winding supports the axial load on the pressure vessel. Helical winding reinforces mostly the dome section of the pressure vessel. The helical winding consists of high and low angle helical windings. The high angle windings along with hoop windings reinforce the cylinder-dome transition area. The low angle helical windings hold the polar boss near the opening. The polar opening section is usually the thickest section in the pressure vessel, as it builds in thickness near the polar opening. The higher the internal pressure, the more the low angle helical layers are required to reinforce the polar opening area to hold the metallic boss. The low angle helical layers are needed to reinforce the dome section and small amount for cylinder section. Majority of the low angle helical layers in the cylinder section only adds to the weight of the tank and results in lowering the storage density of the tank. For example, an optimized 122 L hydrogen tank design (500 mm×1000 mm) consists of total 95 plies 52 helical plies and only 43 hoop plies of hoop.

The methods, systems and devices disclosed are a cost effective solution to weight reduction and strength for composite pressure vessels. By using structure inside the tank that will reduce the overall structure required to support the pressure load. An axial rod (oriented along the axis of the tank, whereby the carbon fiber rod can take the axial load within the tank efficiently) will be placed on the inside of a pressure vessel to reduce the amount of carbon required on the outside tank. The axial rod will replace several of the helical filament wound layers typically required in pressure vessel construction. The rod will be attached at both ends of the vessel and allow for the gas to be filled and emptied Disclosed herein are methods, systems and devices, aspects include supporting two ends of a cylindrical composite pressurized storage vessel with an axial rod/tube fixed axially inside the storage vessel fixed at each end; and, providing a fluid pathway into the vessel from at least one of the two ends which is not obstructed by the axial rod/tubing. In some instances the axial rod is carbon.

Disclosed herein are methods, systems and devices, aspects including supporting two ends of a cylindrical composite pressurized storage vessel with an axial carbon rod/tube fixed axially inside the storage vessel fixed at each end; and, providing a fluid pathway into the vessel from at least one of the two ends which is not obstructed by the axial rod/tubing and wherein the total amount of fiber wrappings around at least one of the high angle and low angle portions of the vessel are reduced thereby reducing the total weight of the vessel via the additional support provided by the axial rod.

Disclosed herein are methods, systems and devices, aspects including fixing an axial rod within a composite pressure vessel including a liner; wrappings of fiber around the liner; fixing the wrappings with an adhesive resin; providing openings on each end of the pressure vessel; fixing a carbon rod fixture within the opening at each end; fixing an inner base within each openings and mating it with each carbon rod fixture; and, whereby the axial rod is fixed axially within the pressure vessel.

Disclosed herein are methods, systems and devices, aspects including fixing an axial rod within a composite pressure vessel including a liner with openings on each end; fiber wrapped around the liner fixed with an adhesive resin; a carbon rod fixture within the opening at each end; an inner base within each opening mated with each carbon rod fixture; and, whereby the axial rod is fixed axially within the pressure vessel. In some instances a fluid pathway is formed into the vessel from at least one of the two ends which is not obstructed by the axial rod/tubing. With the above system the total amount of fiber wrappings around at least one of the high angle and low angle portions of the vessel may be reduced thereby reducing the total weight of the vessel via the additional support provided by the axial rod.

DRAWINGS

The invention may be better understood by referring to the following figures. The components in the figures are not necessarily to scale, emphasis instead being placed upon illustrating the principles of the invention. In the figures, like reference numerals designate corresponding parts throughout the different views.

All content, descriptions and callouts in the Figures are hereby incorporated by this reference as if fully set forth herein.

FURTHER DISCLOSURE

Figure 1:
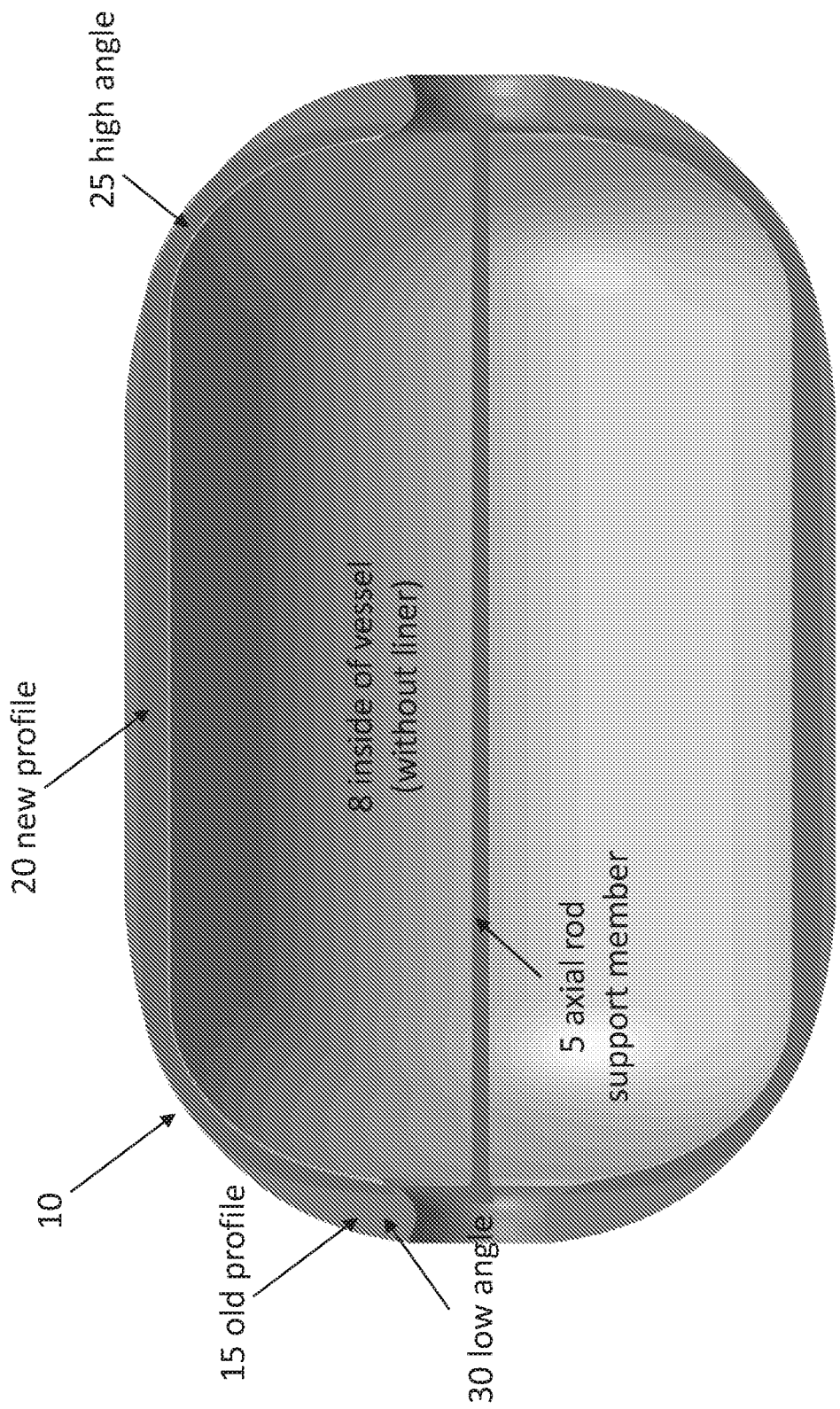
FIG. 1 illustrates a comparison between a traditional composite pressure vessel and an axial carbon rod composite pressure vessel.

In practice of the method and system some of the low angle helical layers are replaced with a straight prefabricated axial rod/tube 5 which is placed inside 8 the composite pressure vessel (tank) 10 from one end to the other for axial support. Inside the tank is a liner 12. Since the axial rod is oriented along the axis of the tank, the carbon fiber rod can take the axial load within the tank efficiently. Dotted traditional outer profile 15 shows a pictorial of the reduction in mass of the fiber wrappings from the traditional outer wrapping profile of a composite pressure vessel to the new profile with axial support 20. The domed ends of the tanks have high angle 25 wrappings and low angle wrappings 30. FIG. 1 illustrates aspects of these concepts.

About 12 kg of low angle helical layers can be replaced with a single carbon rod within a 122 L hydrogen tank along the axis of the tank from one polar opening to the other. In order to meet the axial load requirements, an 11.2 mm diameter carbon rod weighing approximately 0.13 kg is required. The carbon rod can be prefabricated with high temperature cure resins. This will allow placing these carbon rods within the liner molding process, if desired. Note that the plastic liner molding temperature is usually lower than high temperature cure resins. A potential cost saving by using a 0.13 kg carbon rod along tank axis which removes 12 kg of low angle helical layers is in excess of $200.00. Equation 1, derived by balancing axial forces, helps compute axial rod diameter based on optimized low angle helical layers.

$$\sqrt{\frac{PR_1^2 - 2R_1(t_1 - t_2)\sigma_{ft}\cos^2(\theta)}{\sigma_{ft}}} < r < \sqrt{\frac{PR_1^2}{\sigma_{ft}}} \quad \text{Equation 1}$$

Here r is the axial rod radius, P is the internal pressure, $R_1$ is the cylinder section radius with low angle helical layers, $t_1$ and $t_2$ are the low angle helical layer thickness in without and with axial rod tanks, and $\sigma_{ft}$ is the rod material tensile strength from vendor, and $\partial$ is the polar opening helical wind angle.

Figure 2:
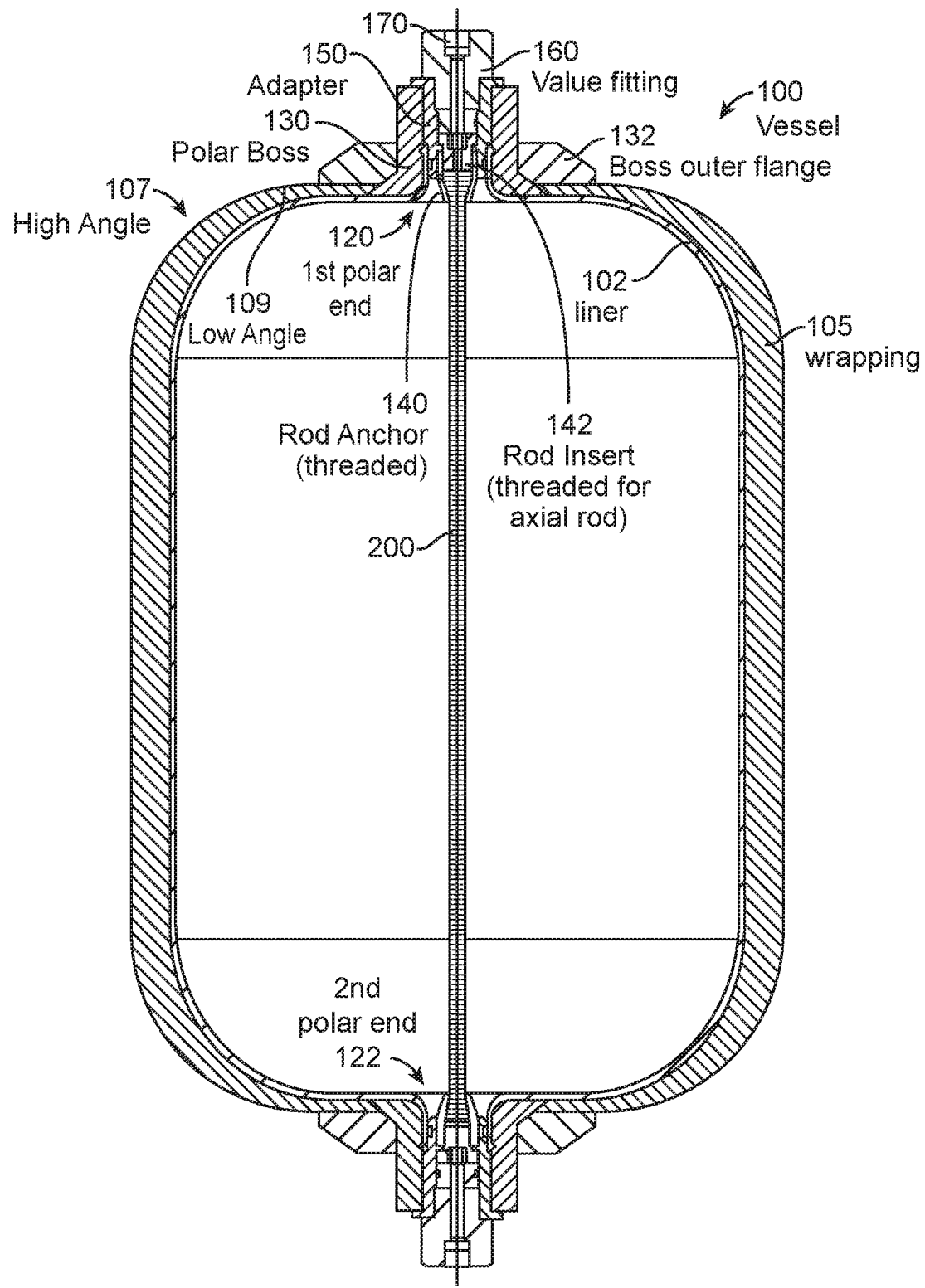
FIGS. 2 and 3 illustrate aspects of a composite pressure with an axial carbon rod.
Figure 3:
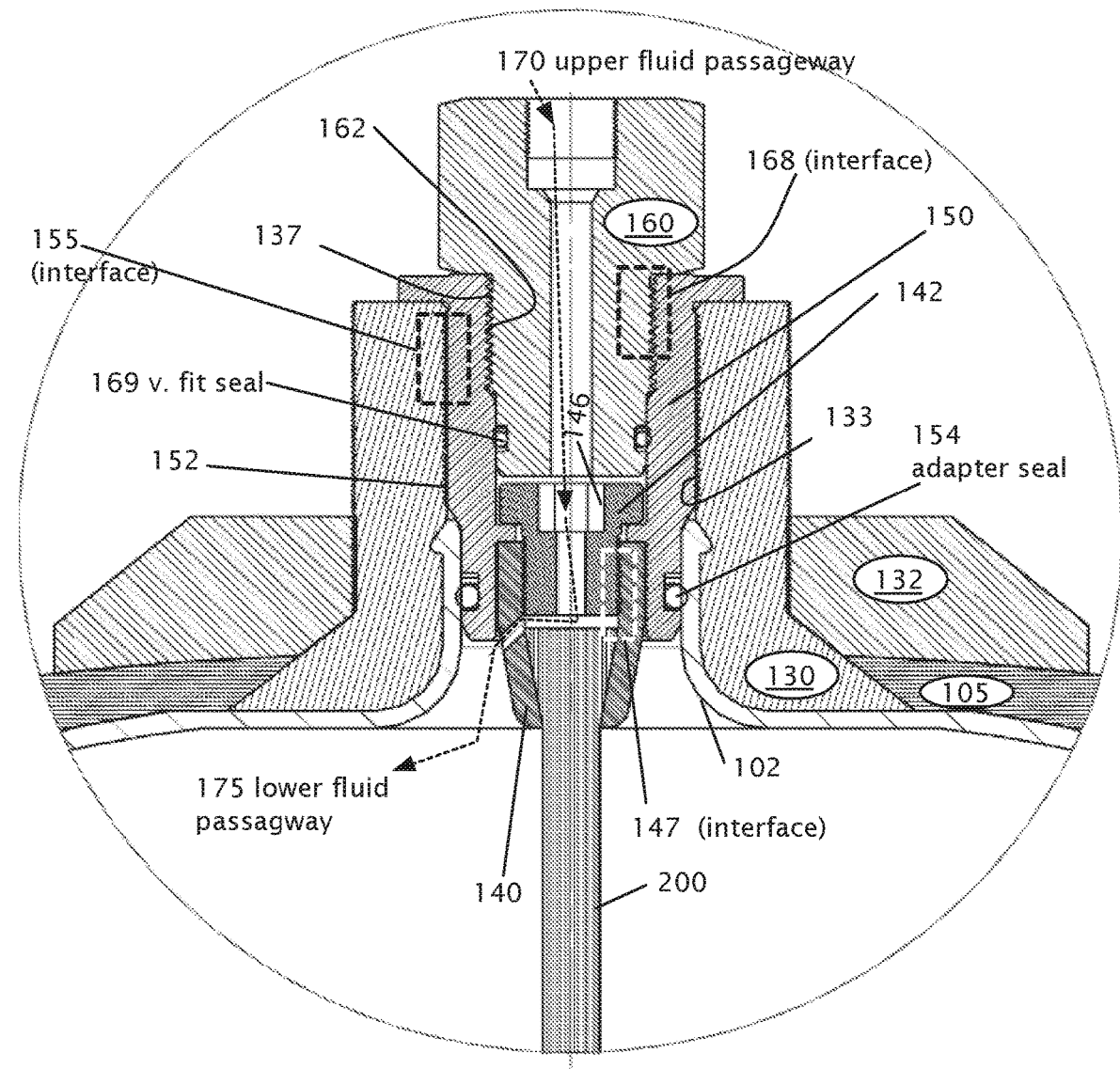

FIGS. 2 and 3 illustrate aspects of a composite pressure vessel (tank) 100 with axial support 200. The tank has a liner 102. The tank is wrapped 105 in fibers adhered with resins. The high angle wrappings 107 and the low angle wrappings 109 are reduced as compared to the old profile shown in FIG. 1. The tank has a first polar end 120 and a second polar end 122. A boss (inside flange) 130 is against the liner and wrapped partially. A boss outer flange 132 is attached over the wrappings and to the inside flange (boss) 130. An anchor 140 to hold a axial rod (or tube or group of carbon rods) attached to a axial rod 200, which may be carbon or other suitable material or combination of material, is fitted into the tank. The attachment of the axial rod via the below methodology can be done at both the first and second polar ends. A threaded rod adapter 142 with an opening 146 to fit a tool such as a hex wrench or other fastening tool is connected to the axial rod 200 and connected at an interface 147 which may be threaded to the rod anchor 140.

The adapter 150 has a threaded outer annular wall 152 which forms an interface 155 with the threaded inner annular wall 133 of the boss 130. An adapter seal 154 forms a seal between the liner 102 and the adapter 150. A valve 160 with threaded annular wall 162 threads into adapter 150 via the threaded inner annular wall 137 and an interface 168 with an o-ring seal 169 is provided.

An upper fluid pathway 170 connects through the tank to a lower fluid pathway 175 whereby gaseous fuel may be added to or removed from the tank.

The manufacturing of the composite pressure vessel, in some instances, will follow the following steps:

1. Liner with liner and boss inside flange.
2. Filament winding thereon.
3. Primary curing.
4. Secondary and final curing.
5. Slide axial rod inside the tank to mount therein. A soft padding material optionally can be used to cushion the rod anchor on the inner surface of the liner. The axial rods have to be coated with plastic (e.g., HDPE) to protect any debris (epoxy) from axial rod to act as an impurity in the stored gases. Note the cyclic load can crack the epoxy over time.
6. Thread in the adapter on either opening. The adapter contains the o-ring and backup rings as well and slides next to the liner inside surface. The adapter has an internal flange that sits against the carbon fiber rod metal fitting and holds the rod in place until further steps.
7. Push in a threaded rod insert with internal hex. The rod insert will thread to the axial rod. This will allow transferring load from boss to axial rod and vice versa.
8. Install boss outer flange.
9. Install valve assembly.
10. Optionally, Leak test, Proof testing and Validation and Certification Finite Element (FE) analysis for the optimized new wrapping layup, show the FE model and corresponding fiber direction strain contour plots indicating that the carbon rod supports the high angle wrappings 107 and the low angle wrappings 109 being reduced (see FIG. 2) as compared to the old profile shown in FIG. 1.

It will be understood that various aspects or details of the disclosures may be changed combined, or removed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A method to support the ends of composite pressurized storage vessels, the method comprising:
   supporting two ends of a cylindrical composite pressurized storage vessel with an axial rod/tube fixed axially inside the storage vessel fixed at each end, having an adapter (150) configured to form a seal with a liner (102), wherein the axial rod diameter is determined by the formula $$\sqrt{\frac{PR_1^2 - 2R_1(t_1 - t_2)\sigma_{ft}\cos^2\theta}{\sigma_{ft}}} < r < \sqrt{\frac{PR_1^2}{\sigma_{ft}}} \ ;$$

wherein the adapter is configured to retain rod adapter having a threaded interface that engages with a rod anchor and the axial rod/tube is connect to the rod anchor disposed in the storage vessel; and;
   providing a fluid pathway into the vessel from at least one of the two ends which is not obstructed by the axial rod/tubing.

2. The method of claim 1 wherein the axial rod is carbon.

3. The method of claim 1 wherein the total amount of fiber wrappings around at least one of the high angle and low angle portions of the vessel are reduced thereby reducing the total weight of the vessel via the additional support provided by the axial rod.

4. The method of claim 1, wherein the axial rod/tube (5) comprises a high temperature cure resin.

5. The method of claim 1, wherein the axial rod/tube (5) has a diameter of approximately 11.2 mm and a weight of approximately 0.13 kg.

* * * * *